R. HILLSON.
Heating Stove.

No. 103,884. Patented June 7, 1870.

Witnesses

Inventor
Robert Hillson

ROBERT HILLSON, OF ALBANY, NEW YORK.

Letters Patent No. 103,884, dated June 7, 1870.

HEATING-STOVE.

The Schedule referred to in these Letters Patent and making part of the same.

*To all whom it may concern:*

Be it known that I, ROBERT HILLSON, of the city and county of Albany, State of New York, have invented certain new and useful Improvements in Heaters and Stoves; and I do hereby declare that the following is a description thereof, reference being had to the accompanying drawing forming a part of this specification, in which—

Figure 1:
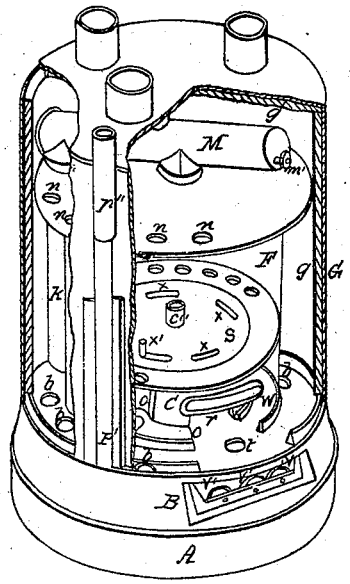
Figure 1 represents a perspective view of the heater or stove as improved, with parts of the outer and inner cylinders broken away, showing improvements.

Heaters and stoves for warming several rooms in a building do not, as a general rule, furnish the amount of warm or hot air they should to such rooms for the amount of fuel consumed on account of—

First, imperfect combustion of the fuel used, much of which passes off and escapes in the form of unconsumed gas or smoke.

Second, on account of the loss of heat by radiation in the heater or stove-room.

Third, on account of the heated air not being retained a longer time in contact with the several heating parts of the apparatus.

Fourth, on account of the difficulty of removing the clinkers that accumulate near the bottom of the fire-pot above the grate.

To enable others to understand my invention I will describe it in reference to the drawing and the letters of reference marked thereon, the same letters indicating like or similar parts.

In the drawing—

A represents the base of a stove or heater.

B is the lower circular air-chamber, communicating with the open base below by the perforations $a\ a$, figs. 2 and 3, and to the chamber above by the perforation $b$, figs. 1, 2, and 3.

Figure 2:
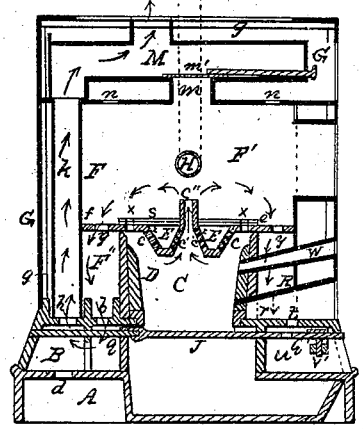
Figure 2 is a vertical lateral section through dotted line No. 1, in fig. 4.
Figure 3:
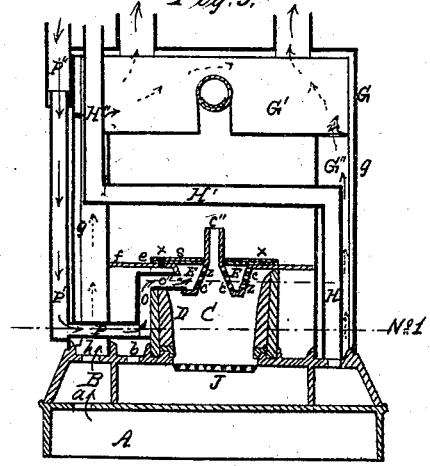
Figure 3 is the same through dotted lines No. 2, in fig. 4.
Figures 5, 6:
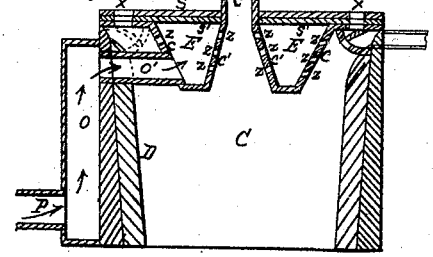
Figure 5 is a cross-section, on an enlarged scale, through fire-pot and perforated air chamber.
Figure 6 is a vertical view of the grate and its adjuncts, on an enlarged scale.

C represents the fire-box lined with fire-brick D, figs. 2, 3, and 5.

Placed immediately over the fire-pot C is an air-heating chamber, E, hung by a projecting flange, $e$, figs. 2, 3, and 5, the edges of which flange $e$ rest upon the top edge of the fire-pot C.

The said air-heating chamber E depends down with sloping sides $c$ to, and terminates at, its bottom, which bottom continues but a short distance, and meets the inner sides $c'$ of the said chamber, which sides $c'$ rise up cone-like, and terminate in a flue, $c''$, or pipe, with a small opening, shown in figs. 1, 2, 3, and 5.

The sides $c$ and $c'$ of the chamber E are furnished with perforations $z\ z$, through which perforations $z$ the air (entering the said chamber E) passes out to impinge in all directions on the gas and flame as they may ascend in the fire-pot, upward, at the sides and in the center of the same, as they (the gas and flame) may be drawn by the draught through the flues $x\ x$, and the central flue $c''$.

The top of the chamber E is formed by the plate S, and is furnished with draught-holes $x\ x$, figs. 1, 2, 3, and 5, which are placed directly over similar draught-holes made in the flange $e$; a damper, S', is interposed between the said top-piece S of the chamber E, and the supporting-flange $e$ of the piece forming the chamber E, which damper may be closed or opened at pleasure by means of the projecting stem $x'$, fig. 1.

The fire-pot C is surrounded by a cylinder or jacket, F, figs. 1, 2, 3, and 4, forming a heating-chamber, F', which chamber F' is divided by the rim $f$, figs. 1, 2, and 3, starting out from the top of the fire-pot C, and fitting to the inside of the cylinder F, thus forming a second or lower chamber, F'', within the said cylinder F, and below the chamber F'; a communication is made with the upper chamber F' to the chamber F'' below, by means of the opening $y$, figs. 2 and 4, made in the projecting rim $f$.

In the top of the upper chamber F' is made a flue, $m$, which flue is provided with a damper, $m'$, figs. 2 and 3, operated by a handle or rod shown in fig. 1.

The heater is also provided with a second outer jacket or cylinder, G, which incloses all the parts of the heating apparatus.

This outer jacket may be lined with fire-brick, soap-stone, or any other suitable non-conducting material, $g$, figs. 1, 2, and 3. The top of the said outer jacket may also be lined with non-conducting material the same as the inside of the said jacket.

Leading from the top of the outer jacket are flues, one or more of which communicate with the room or rooms to be heated.

The chamber formed by the said jacket G is divided by the projecting rim of the top of the inner jacket F, forming the upper chamber G', and lower chamber G'', and communication is had from the said lower chamber G'' to the upper chamber G' by means of the openings $n\ n$, fig. 1.

The air to be heated in the chamber G' and G'' is admitted to the same through the openings $h$, figs. 1 and 2, made in the base.

I also run through the inner chamber F'', above the fire-pot C, a flue, H, (or several of them, crossing each other over one another,) which flue H draws air through the perpendicular pipe H' from the base B, fig. 3, and discharges the air thus drawn, when heated, through the exit-pipe H".

When several such pipes H are passed through the said chamber F', each drawing from its feed-pipe H', and discharging through their exit-pipes H", I would place them one above the other crosswise, and would lead from the pipe nearest to the fire-pot into the coldest room in the building to be heated; and the pipe next above I would lead to the next coldest, and so on, and, in so doing, I would be able to use and discharge in several different rooms each a different temperature of heat.

Figure 4:
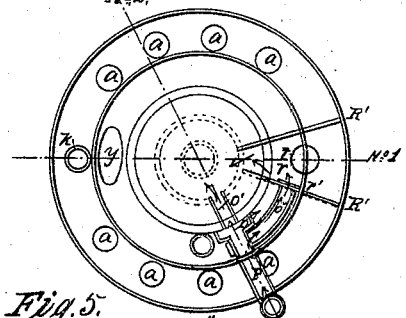
Figure 4 is a vertical view through line No. 1, in fig. 3.

To supply air to the air-heating chamber E, figs. 2, 3, and 5, (to be heated and impinge on the flame, gas, and smoke,) I form outside the fire-pot C a chamber, O, figs. 1, 3, and 4, and I connect the said chamber O with the hot-air chamber E by means of the pipe O' leading into the lower part of the said chamber o in a feed-pipe p, which draws from the pipe p'.

The said pipe p' connects with a pipe, p", into which it can be moved vertically upward sufficiently to uncover the opening of the pipe P.

The pipe p" is intended to lead from an air-tight chamber or other room in the upper part of the building, and draw therefrom the impure air that is apt to rise from below.

When the pipe p' is thrown up vertically so as to uncover the opening of the pipe p, the air fed into the air-chamber E will be drawn from the heater-room.

I also make, in the stove or heater, on a plane with the grate J, an opening or flue, r, which opening is covered by the incasing piece R, fig. 2; the said incasing piece is constructed with sides R' R', fig. 4, which project down from the top R, and rest on the base-plate below, as shown in fig. 2.

Being thus constructed, the said incasing piece R cuts off all communication of the said opening or flue r with the chambers F" and G' at that point, and renders the said opening r the same as a flue to conduct air into the fire-pot C in a horizontal line of direction with the top of the grate.

I also lead from the bottom of the chamber o a flue, o", figs. 1 and 4, which flue o" communicates with the covered opening or flue r; at the point of juncture of the flue r with the flue o" I make a damper, r', by which damper the air can be cut off from entering the said flue r from the flue o" leading from the bottom of the chamber o, fig. 4, or the air can be permitted to enter the said flue r to feed the fire on a horizontal plane with the top of the grate.

By means of the several flues, (the flue o' leading into the chamber E from the chamber o, and the flue o" leading from the same said chamber o to the flue or covered opening r, when the damper r' is set to open the same,) air drawn by the pipes p p' p" into the chamber o will feed into the chamber E above the fire, and through the flue r into the base of the fire-pot on a horizontal plane with the top of the grate J, at one and the same time.

The opening r extends from the outer cylinder of the heater into the fire-pot, and is provided in its floor with a dump-hole, t, through which clinkers (when drawn out from the fire-pot) may be passed to the ash-pit u below.

This opening r serves the double purpose of feeding air into the fire-pot at its base, from the chamber o, and also of affording means for the removal of the cinders and clinkers that are apt to accumulate above the grate, and cannot be made to pass through the usual openings in the grate, which clinkers can, through this opening r, be removed by means of a poker, or other suitable instrument.

The grate J, made in any suitable manner, is hung at its rear by a jointed roller-bar, q, fig. 2, and in front by the lever handle q'.

The jointed roller-bar q may be made male and female, or with single lips, or in any other manner which will permit a free lateral vibrating movement when the grate is in a horizontal position; the lever-handle q' works in a movable shoe, V, which shoe V moves over several rollers V' V', fig. 2, when the grate is shaken laterally, as described.

The rollers V' V' have proper bearings over the ash-pit u.

Being thus constructed and arranged the grate is firmly held in a horizontal position for the mass of fuel to be supported, and can be readily and freely vibrated when desired, and easily dumped by the rolling of the jointed roller-bar q and the lever-handle q' in their places or bearings.

To operate with this heater or stove, the fuel is placed in the usual fire-pot C, through the feed-mouth W, figs. 1 and 2, and the fire lighted; the damper S', fig. 5, is then turned open, and also the damper m' in pipe M, fig. 2, when the draught will be direct.

When the fuel has become well ignited, the damper m' may be closed, and when closed the products of combustion will pass into the chamber F', thence down into chamber F", thence into the chamber B, through the several openings or ports provided, as shown by arrows in fig. 2, thence up and out through the flues or pipes K and M.

When the damper S', fig. 5, is closed, the air drawn from pipes P", P', and P, or from P alone, will pass into the chamber o, and from thence through the flue o' into the chamber E, figs. 3 and 5, in the manner indicated by arrows, and, after becoming heated, will pass out through the perforations z z into the fire-pot C, to act upon the gas and flame in several directions.

When the damper r', at the junction of the flue o", with the flue r, is opened, a portion of the air drawn by the pipes P P' P" will be admitted from the chamber o into the said flue or opening r to feed the fire at the base of the fire-pot C, and above the grate J, and on a plane with the top of the same; while the other portion of the air drawn by the said pipes P P' P" will feed into the chamber E above the fire, and, when the damper r' is closed, (and the hole in the base of the fire-pot facing the flue r is unstopped,) the air will be fed into the face of the fire-pot above the grate, provided the outer door of the said flue or covered opening r is opened.

When air is admitted into the pipe H' from any suitable opening either in the base of the stove, as shown in fig. 3, or elsewhere, the said air will pass into the air-pipe H, running horizontally over the fire-pot C, and become heated to a high degree of temperature, and is led off through the pipe H" to the room or rooms to be warmed. Several such horizontal pipes H, crossing one another, and placed one above another, can be used to good advantage to warm rooms remote in a building.

The air to be heated in the outer chambers G' and G" formed between the inner jacket F and outer jacket G, finds entrance into the said chambers from the base below through the parts provided, as shown, and passes in the manner indicated by dotted arrows to the usual distributing-pipes to be conveyed to the several rooms to be warmed.

Having described my invention,

What I claim, and desire to secure by Letters Patent, is—

1. The air-chamber, constructed as described, and located above the fire-pot C, and surrounding the central flue c", in combination with the damper S' furnished with draught-holes x, substantially as and for the purpose set forth.

2. In combination with the chamber E, perforated as described, the chamber o, pipes or flues o', and p p' p", substantially as and for the purpose set forth.

3. In combination with the covered opening or flue $r$, the flue $o''$, and damper $r'$, substantially as and for the purpose set forth.

4. The incasing piece R, constructed with the sides R' R', substantially in the manner set forth, for the purpose specified.

5. The flues or openings $n$, in combination with the chambers G' and G'', substantially as and for the purpose set forth.

6. The flue $m$, and damper $m'$, in combination with the chamber F' and flue M, substantially as and for the purpose set forth.

7. The flue K, in combination with the circular chamber B and flue M, substantially as and for the purpose set forth.

8. The dump-hole $t$, in combination with the covered opening or flue $r$, and ash-pit $u$, substantially as and for the purpose set forth.

9. Supporting the rear of the grate J by means of the jointed roller-bar $q$, substantially as and for the purpose set forth.

10. In combination with the grate J, the lever-handle $q'$, shoe $v$, rollers $v'\ v'$, when all are arranged substantially as and for the purpose set forth.

ROBERT HILLSON.

Witnesses:
 ALEX. SELKIRK,
 W. S. BUCKBEE.